(12) United States Patent
Hossain

(10) Patent No.: US 6,436,576 B1
(45) Date of Patent: Aug. 20, 2002

(54) CARBON-CARBON COMPOSITE AS AN ANODE FOR LITHIUM SECONDARY NON-AQUEOUS ELECTROCHEMICAL CELLS

(75) Inventor: Sohrab Hossain, Tucson, AZ (US)

(73) Assignee: LiTech, L.L.C., Tucson, AZ (US)

( * ) Notice: Subject to any disclaimer, the term of this patent is extended or adjusted under 35 U.S.C. 154(b) by 0 days.

(21) Appl. No.: 09/577,638

(22) Filed: May 24, 2000

(51) Int. Cl.⁷ .............................. H01M 4/36; H01M 4/66
(52) U.S. Cl. ............................ 429/231.8; 429/231.2; 429/231.4; 429/233
(58) Field of Search .................... 429/231.8, 231.2, 429/231.4, 233

(56) References Cited

U.S. PATENT DOCUMENTS

| | | | |
|---|---|---|---|
| 5,028,500 A | | 7/1991 | Fong et al. |
| 5,153,082 A | * | 10/1992 | Ogino .................. 429/194 |
| 5,158,578 A | | 10/1992 | Yoshimoto et al. |
| 5,443,928 A | | 8/1995 | Takeuchi et al. ......... 429/231.4 |
| 5,580,538 A | * | 12/1996 | Bito .................... 423/447.4 |
| 5,667,914 A | | 9/1997 | Nagamine et al. |
| 5,698,340 A | | 12/1997 | Xue et al. |
| 5,776,633 A | * | 7/1998 | Mrotek .................. 429/218 |
| 5,834,138 A | | 11/1998 | Yamada et al. |
| 6,042,969 A | | 3/2000 | Yamada et al. |

FOREIGN PATENT DOCUMENTS

| | | | |
|---|---|---|---|
| EP | 0 803 926 A | 10/1997 | |
| WO | WO9624956 | * 8/1996 | ............ H01M/4/02 |
| WO | WO 98/47195 | 10/1998 | |

OTHER PUBLICATIONS

Essentials of Carbon–Carbon Composites, Edited by C.R. Thomas, The Royal Society of Chemistry, Cambridge, 1993 (cover, preface and pp. 1–37).

Carbon–Carbon Composites, by G. Savage, Chapman & Hall, New York, 1993 (cover, preface and pp. 276–323).

Patent Abstracts of Japan: Title: Manufacture of Carbon Substrate for Lithium Secondary Battery Negative Electrode, and Negative Electrode for Lithium Secondary Battery. Publication No. 10021916; Publication Date: Jan. 23, 1998; Inventor: Saeki Toru.

Patent Abstracts of Japan: Title: Negative Electrode for Lithium Secondary Battery and Lithium Secondary Battery Using Same Electrode. Publication No.: 05283061; Publication Date: Oct. 29, 1993; Inventor: Mabuchi Akihiro.

Patent Abstracts of Japan: Title: Lithium Secondary Battery. Publication No.: 11250909; Publication Date: Sep. 17, 1999; Inventor: Nishio Koji.

* cited by examiner

Primary Examiner—Gabrielle Brouillette
Assistant Examiner—Mark Ruthkosky
(74) Attorney, Agent, or Firm—Lawrence R. Oremland, PC

(57) ABSTRACT

The present invention provides a secondary electrochemical cell comprising a body of aprotic, non-aqueous electrolyte, first and second electrodes in effective electrochemical contact with the electrolyte, the first electrode comprising active materials such as a lithiated intercalation compound serving as the positive electrode or cathode and the second electrode comprising a carbon-carbon composite material and serving as the negative electrode or anode; whereby they provide a secondary non-aqueous electrochemical cell having improved cycle life and shelf-life characteristics as compared with similar secondary non-aqueous electrochemical cells having carbon anodes that are not carbon-carbon composite.

19 Claims, 7 Drawing Sheets

Schematic Diagram of a Lithium Ion-Cell.

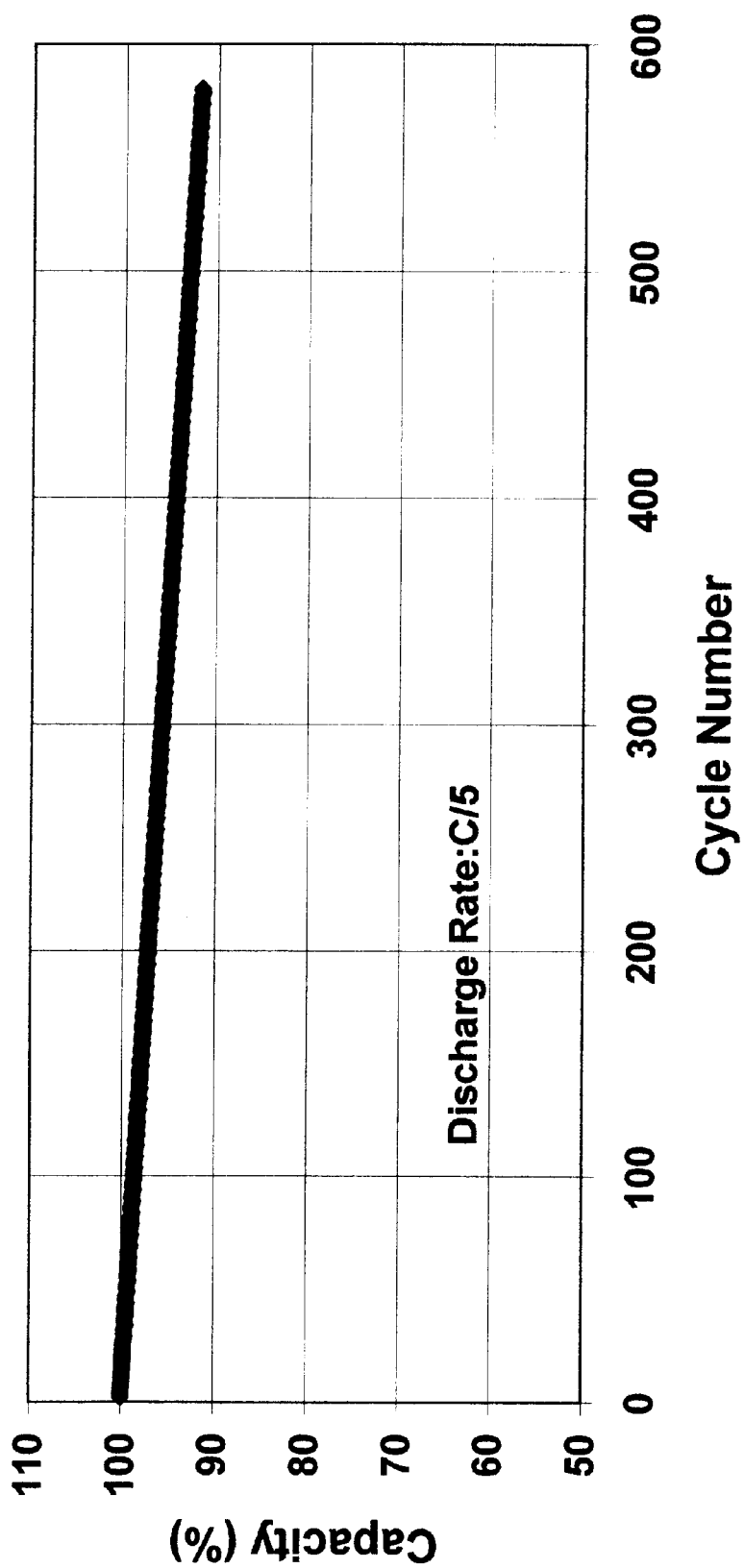
Fig. 1: Cycling Behavior of a Lithium-ion Cell at made according to the Present Invention. Anode: C-C Composite; Cathode: LiCoO2; Electrolyte: 1M LiPF6 in EC/DMC (1:1 v/v).

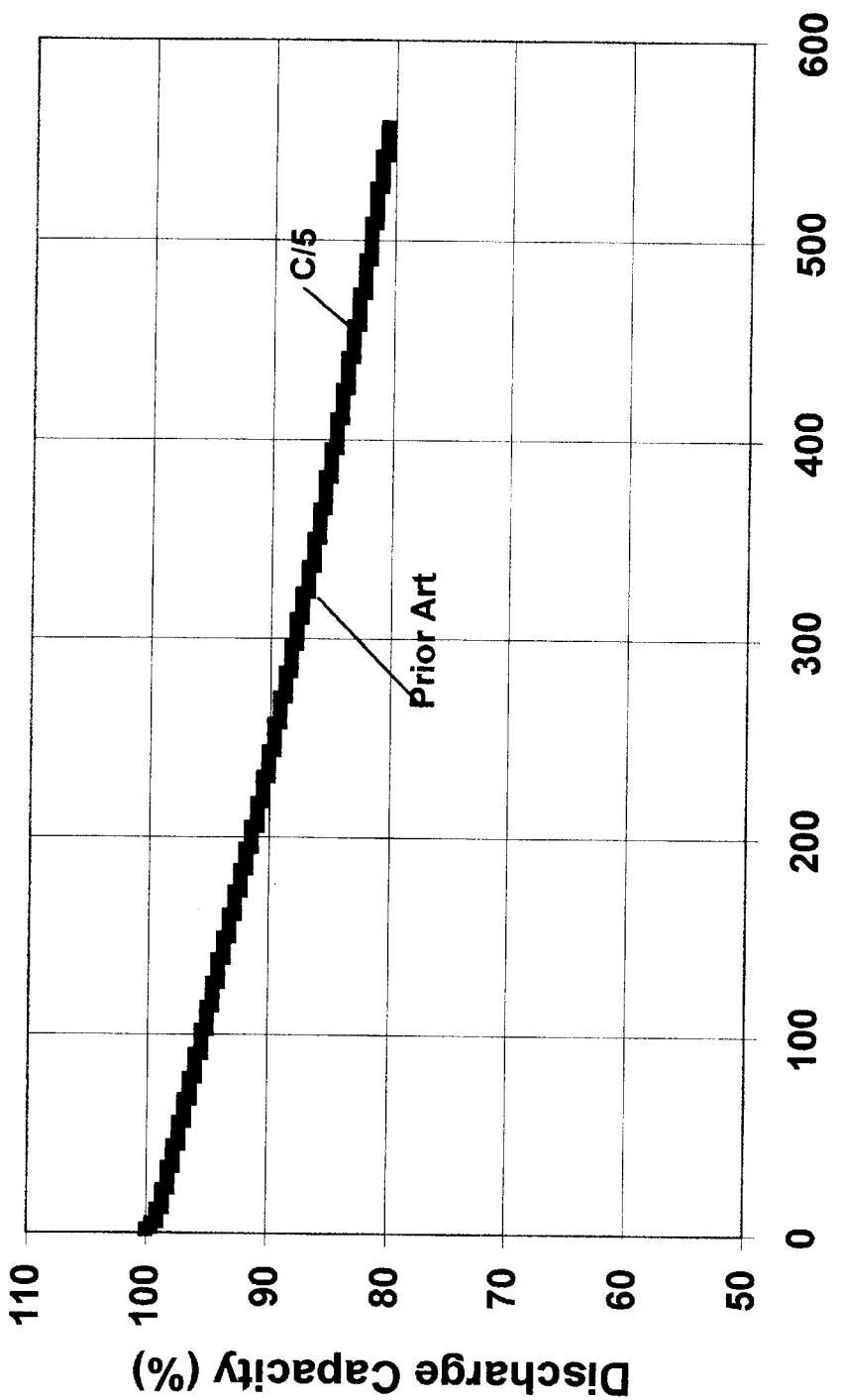
Fig. 2: Cycling Behavior of a Lithium-ion Cell made in accordance to the prior art. Anode: MCMB 2528 Graphite; Cathode: LiCoO2; Electrolyte: 1M LiPF6 in EC/DMC (1:1 v/v).

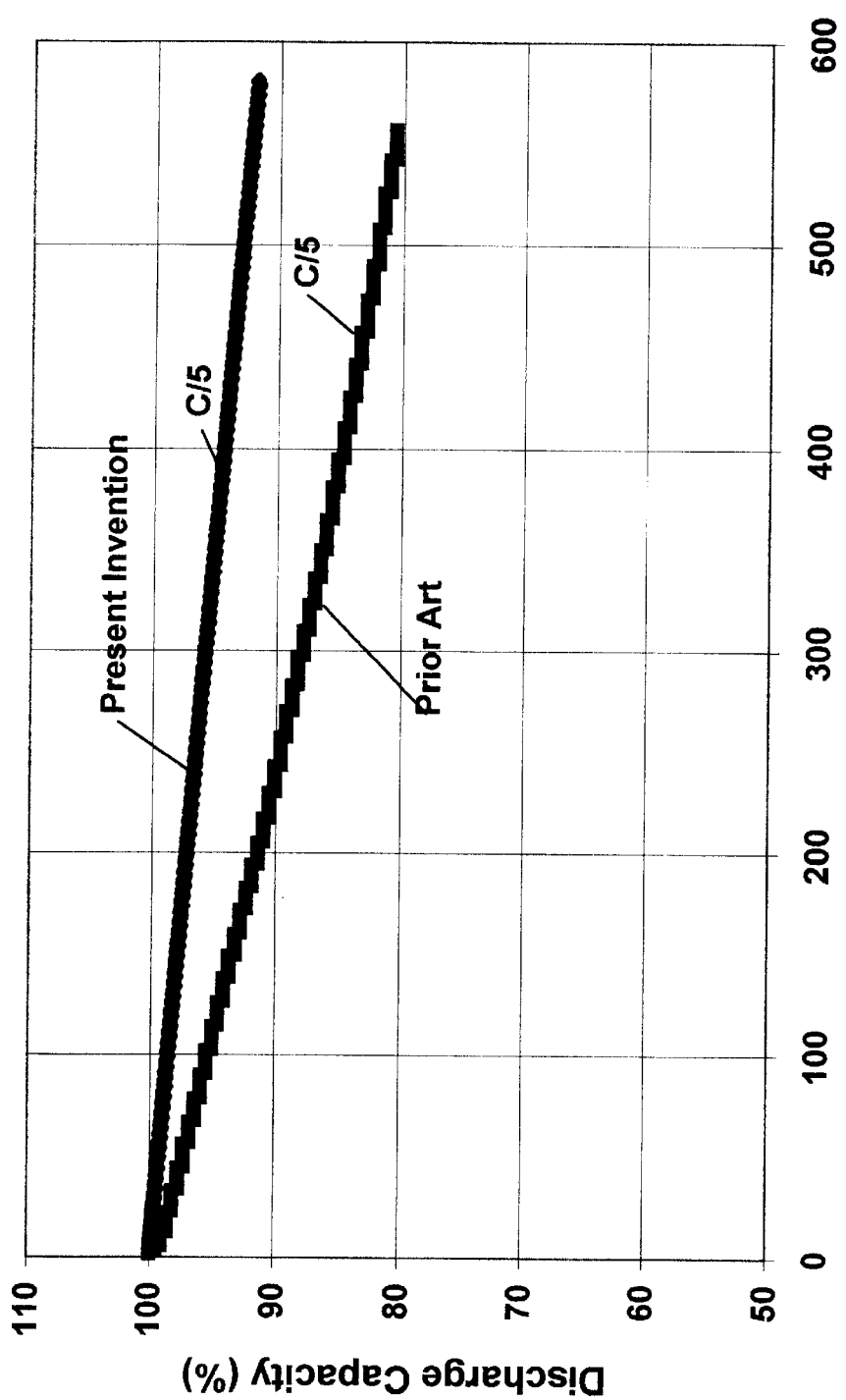
Fig. 3: Comparison of Cycling Behavior of Lithium-ion Cells made in accordance to the prior art and in accordance to the Present invention.

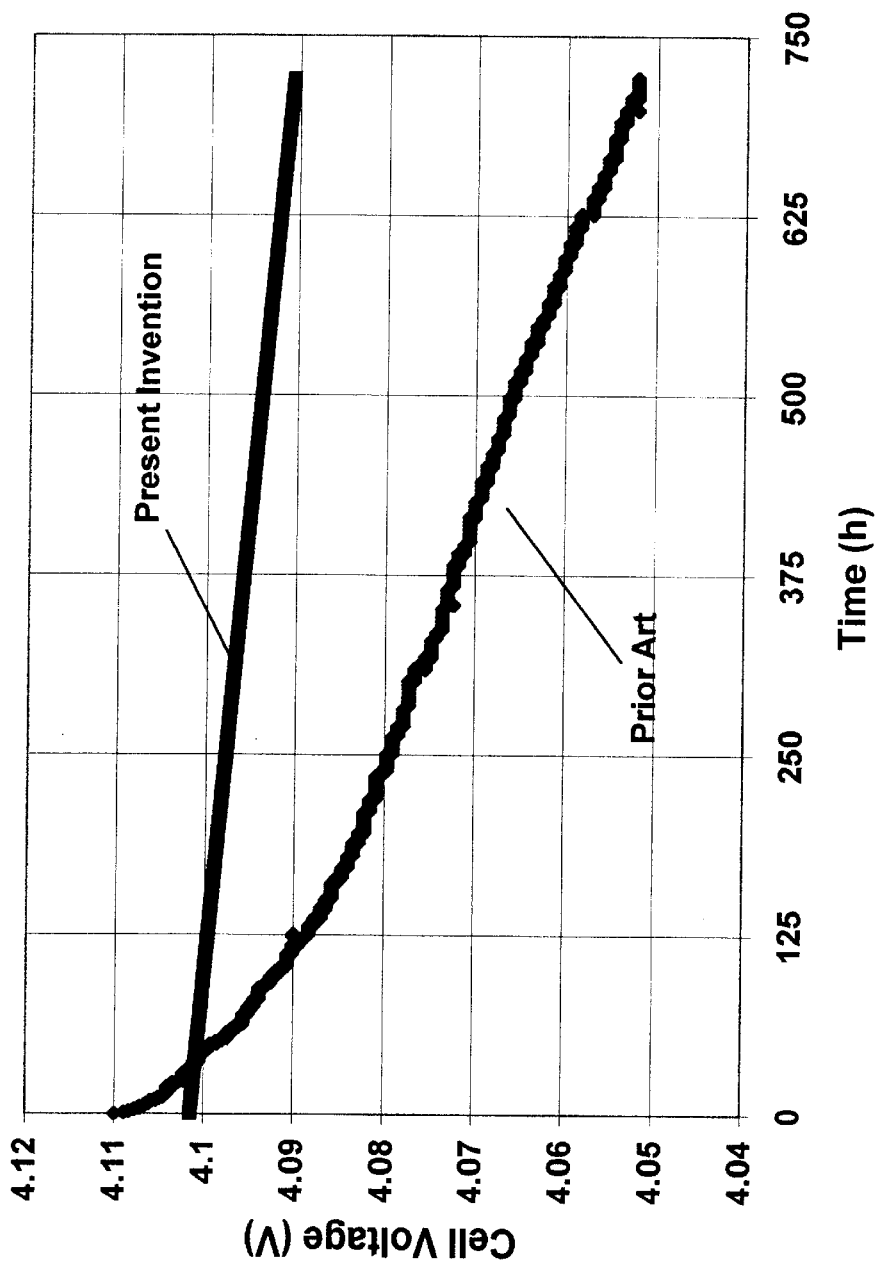
Fig. 4: Voltage Decay of Lithium-ion Cells made in accordance to the Prior art and in accordance to the Present Invention at Open-Circuit Voltage.

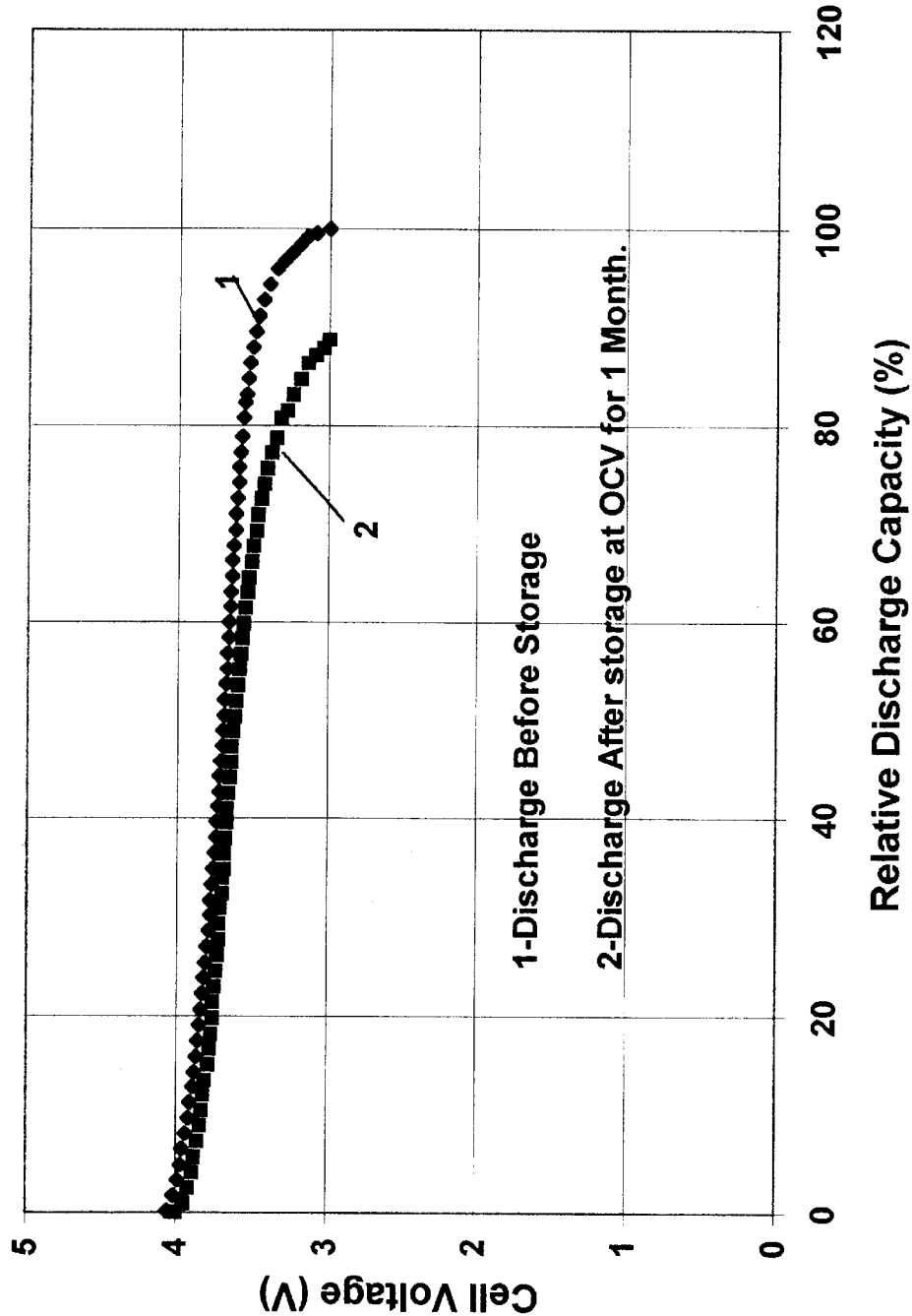
Fig. 5: Discharge Behavior (Before and After Storage) of a Lithium-ion Cell made in accordance with the prior art.

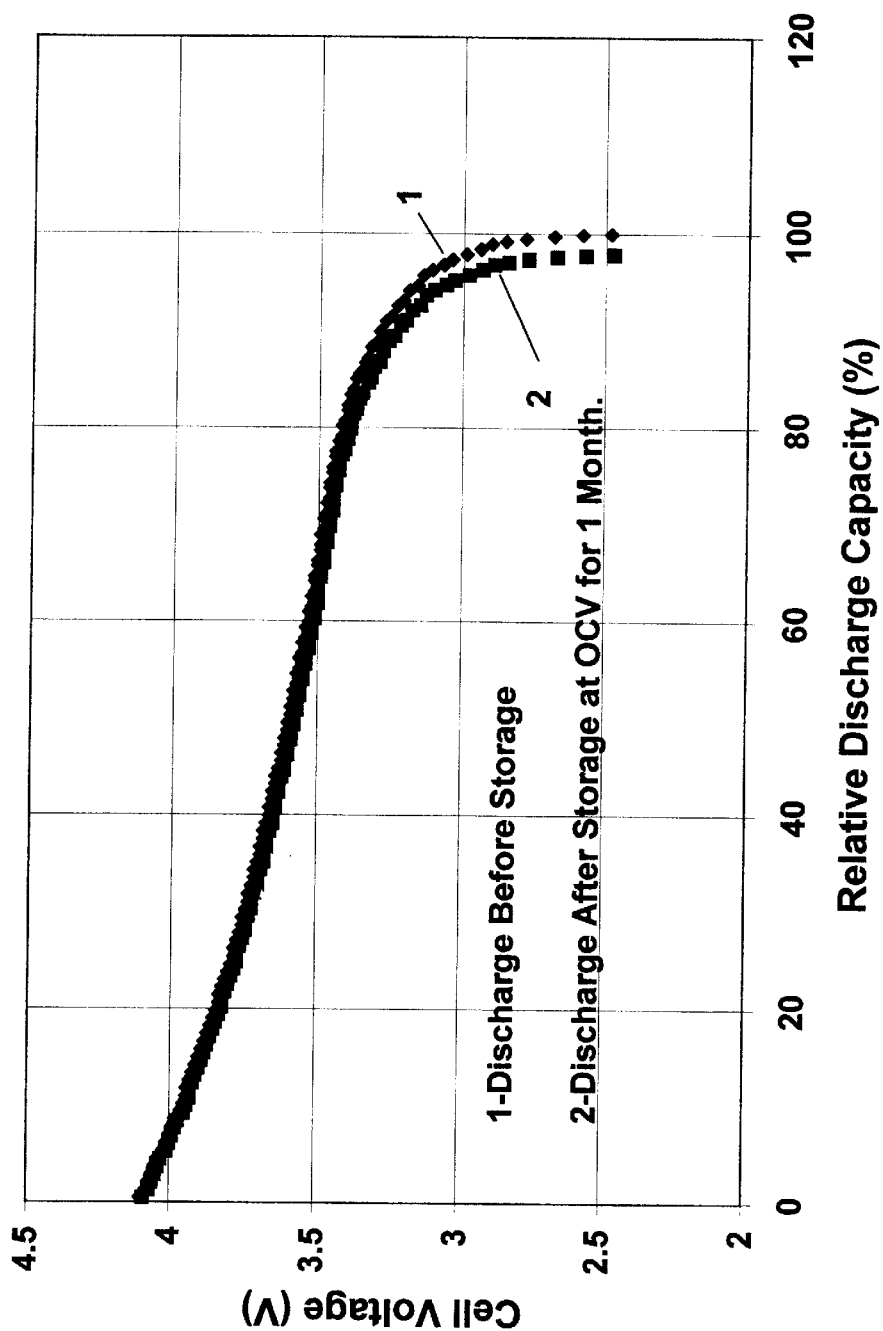
Fig. 6: Discharge Behavior (Before and After Storage) of a Lithium-ion Cell made in accordance with the present invention.

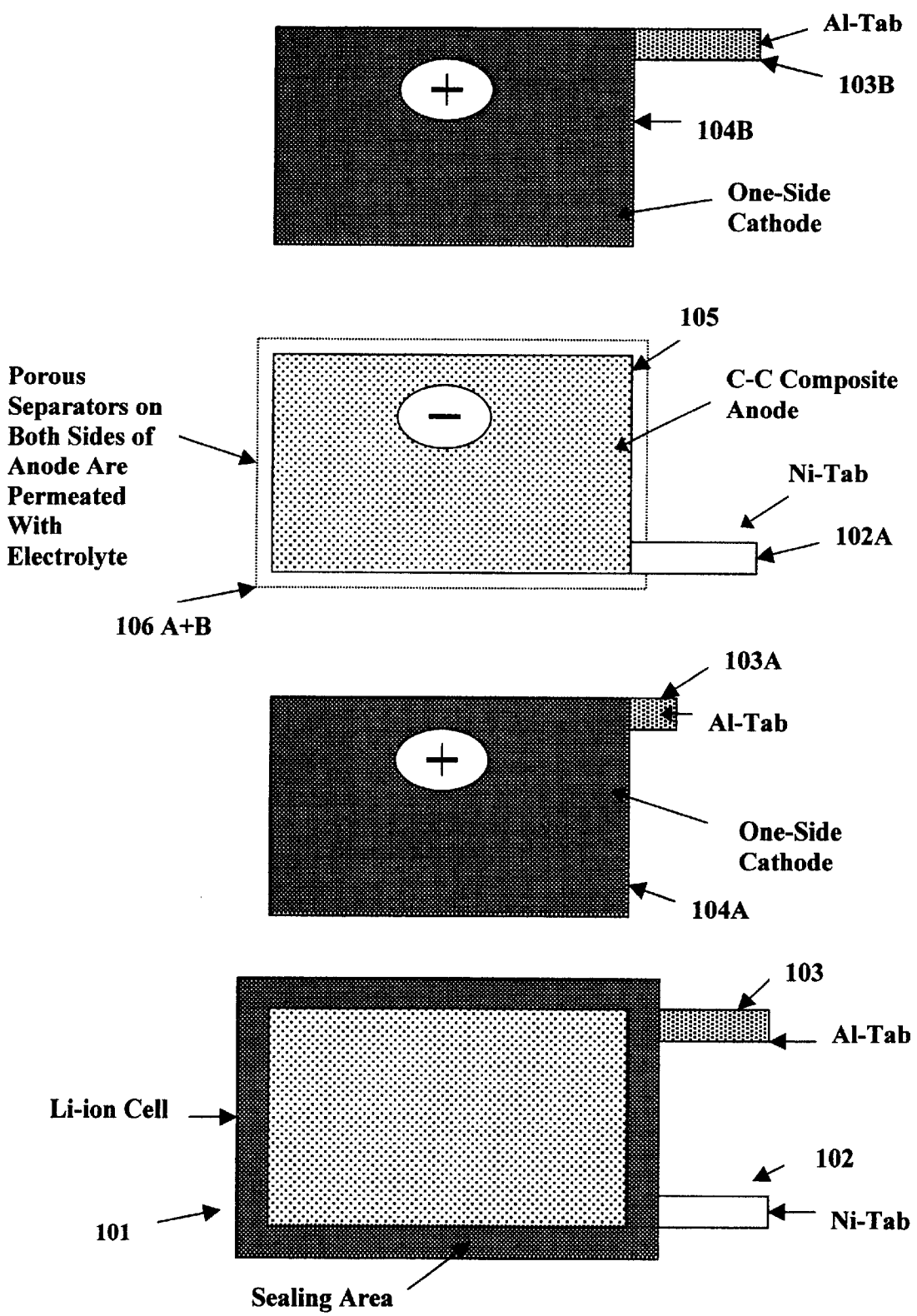
Fig. 7: Schematic Diagram of a Lithium Ion-Cell.

CARBON-CARBON COMPOSITE AS AN ANODE FOR LITHIUM SECONDARY NON-AQUEOUS ELECTROCHEMICAL CELLS

FIELD OF INVENTION

The present invention relates generally to lithium ion, non-aqueous secondary electrochemical cells, and to batteries formed of such cells and, more particularly, to the use of carbon-carbon composite material as the active material for the negative electrode of such cells and batteries, to improve cycle life and self discharge characteristics of such cells and batteries.

DESCRIPTION OF THE PRIOR ART

Since its introduction and commercialization in 1991, rechargeable (or secondary) lithium-ion battery systems have received considerable interest not only to the battery community but also to the electronic industries. In lithium-ion batteries, carbon or graphite is used as an anode, a lithiated transition metal intercalation compound is used as a cathode and $LiPF_6$ is used as an electrolyte in carbonate-based organic solvents. For example, the reactions at the electrodes and overall cell reaction of an oxide-containing lithium intercalation compound are as follows:

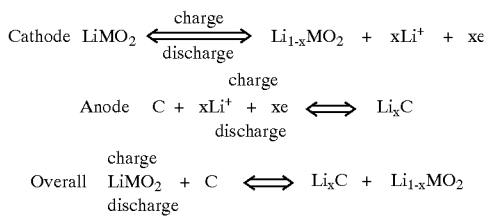

where $LiMO_2$ represents the lithiated metal oxide intercalation compound.

The electrochemical process is the uptake of lithium ions at the anode during charge and their release during discharge, rather than lithium plating and stripping as occurs in metallic lithium rechargeable battery systems. As metallic lithium is not present in the cell, lithium-ion cells provide enhanced safety and a longer cycle life than the cells containing metallic lithium. Because of their advantageous characteristics, lithium-ion batteries are widely used for consumer electronics applications such as cellular phones, laptop computers, camcorders, and personal digital assistant.

At present, special type of hard carbon or graphite is used as active anode material in commercial lithium-ion batteries. Polyvinyledene fluoride (PVDF) is used as a binder to improve the mechanical integrity of the electrode. Copper is universally used as the substrate for anode. Hard carbon or graphite material is mixed with PVDF in an organic solvent (N-methyl pyrolidone or dimethyl formamide) and the mixture is coated on the copper substrate to produce the anode.

Recently, there are a number of patents issued (e. g., Fong et al., U.S. Pat. No. 5,028,500; Bito et al., U.S. Pat. No. 5,580,538; Yoshimoto et al., U.S. Pat. No. 5,158,578; Nagamine et al., U.S. Pat. No. 5,667,914; Xue et al., U.S. Pat. No. 5,698,340; Yamada et al., U.S. Pat. No. 5,834,138; Nagamine et al., U.S. Pat. No. 5,932,373; Yamada et al., U.S. Pat. No. 5,972,536; and Yamada et al., U.S. Pat. No. 6,042,969) on the development of carbon materials as anode of secondary non-aqueous electrochemical cells.

During charge-discharge process, due to intercalation and de-intercalation of lithium-ions, a significant expansion and contraction of anodes occurs that can loosen the mechanical integrity and thereby impedance of the electrodes. This increase in impedance of the anode causes capacity fade of lithium-ion batteries during cycling. The present state-of-the-art lithium-ion battery delivers approximately 500 cycles at 100% depth of discharge with 80% capacity retention. There are many applications (e.g., aerospace and transportation) that demand higher cycle life.

Another disadvantage of the state-of-the-art lithium-ion battery is its relatively high self-discharge. The present lithium-ion battery loses 7% to 12% capacity per month at ambient temperature. The loss is even higher at higher temperatures.

OBJECTIVES AND ADVANTAGES OF PRESENT INVENTION

Accordingly, it is the primary objective of the present invention to improve the cycle life of lithium-ion electrochemical cells and battery systems using such cells.

Another objective of the present invention is to improve the self-discharge characteristics of lithium-ion electrochemical cells and battery systems using such cells.

Still another objective of the present invention is to provide a novel and improved rechargeable lithium-ion cell and battery system which utilizes carbon-carbon composite material as anode.

SUMMARY OF THE INVENTION

Briefly stated, this invention provides a secondary electrochemical cell comprising a body of aprotic, non-aqueous electrolyte, first and second electrodes in effective contact with said electrolyte, the first electrode comprising an active material such as lithiated intercalation compound and the second electrode comprising carbon-carbon composite material. In accordance with this invention, commercially available carbon-carbon composite material of high electronic conductivity which also provides high lithium-ion intercalation capacity is chosen for the negative electrode, i.e., anode of the electrochemical cell. The carbon-carbon composite anode itself is also used as current collector. The mechanical strength of the carbon-carbon composite anode is superior to the carbon or graphite anode used in commercial lithium-ion batteries. The composite can accept repeated expansion and contraction as a result of intercalation and de-intercalation of lithium-ions during charge-discharge process with a little or no change in mechanical integrity. The impedance of the anode, therefore, remains almost the same. The cycling behavior of the lithium-ion cells made with the carbon-carbon composite shows significant improvement.

Carbon-carbon composite electrode consists of a single phase, does not contain any binder and there is no metal carbon interface. The self-discharge behavior of an electrochemical cell made with the carbon-carbon composite material as anode is, therefore, improved.

BRIEF DESCRIPTION OF THE DRAWINGS AND EXHIBITS

In the accompanying drawings:

FIG. 1 is a graph representing the cycling behavior of a lithium-ion cell made with carbon-carbon composite anode in accordance with the present invention;

FIG. 2 represents the cycle life of a lithium-ion cell made in accordance with the prior art;

FIG. 3 represents a comparison of the cycling behavior of lithium-ion cells made in accordance with the present invention and in accordance with the prior art;

FIG. 4 represents a comparison of the voltage decay of lithium-ion cells made in accordance with the prior art and in accordance with the present invention;

FIG. 5 represents the discharge behavior (before and after storage) of a lithium-ion cell made in accordance with the prior art;

FIG. 6 represents the discharge behavior (before and after storage) of a lithium-ion cell made in accordance with the present invention; and FIG. 7 is a schematic representation of a lithium-ion cell embodying a carbon-carbon composite anode in accordance with the present invention.

Exhibits A through D are similar to FIGS. 3 through 6, respectively, but illustrating, for better contrast, certain characteristics in different colors.

DESCRIPTION OF THE PREFERRED EMBODIMENTS

In a preferred form of the present invention, a lithium-ion cell is comprised of a negative electrode of carbon-carbon composite material heat treated in the range of 1000° C. to 3000° C. and having high electronic and thermal conductivity, and a positive electrodes containing $LiCoO_2$, $LiNiO_2$, $LiNiCoO_2$, $LiMn_2O_4$, $LiMnO_2$, $LiV_2O_5$, $LiV_6O_{13}$, $LiTiS_2$, $Li_3FeN_2$, $Li_7VN_4$, $Li_7MoN_4$, $Li_2ZrN_2$ or combinations of these materials. The carbon-carbon composite material is also used as the substrate for the negative electrode.

The electrolyte used in a lithium-ion cell and battery of the present invention is a non-aqueous aprotic organic electrolyte and preferably a non-aqueous solution consisting of a solute, such as $LiPF_6$, $LiBF_4$, $LiAsF_6$, $LiCF_3SO_3$, $LiN(CF_3SO_2)_2$ or $LiClO_4$, dissolved in a solvent such as propylene carbonate, ethylene carbonate, diethyl carbonate, dimethyl carbonate, ethyl methyl carbonate and as well as mixtures thereof.

There are a number of known approaches suitable for producing carbon-carbon composite material, which are described e.g. in the following review Books: Essentials of Carbon-Carbon Composites, Edited by C. R. Thomas, The Royal Society of Chemistry, Cambridge, 1993 and Carbon-Carbon Composites, by G. Savage, Chapman & Hall, New York, 1993. The disclosures of such review books are incorporated herein by reference. The carbon-carbon composite is made for this invention by heat treating at the temperature range of 1000–3000° C. in inert atmosphere and can have density, specific resistance, and thermal conductivity in the range of 1.3–2.0 g/cc, 50–1,000 $\mu$ohm-cm, and 50–600 $Wm^{-1}K^{-1}$, respectively. The carbon fiber used to make the carbon-carbon composite can be pitch-, PAN-, and/or rayon-based fiber. For purpose of present invention, pitch and PAN-based fibers are preferable. Other than the foregoing general parameters, the present invention is not limited to any specific approach to produce carbon-carbon composite.

A preferred form of lithium-ion cell embodying a carbon-carbon composite anode is shown in FIG. 7. Wherein the assembled cell 101 is shown with the anode, cathode, and electrolyte enclosed in a sealed sandwich structures with the carbon-carbon composite anode electrically accessible by means of protruding nickel conductive tab 102 and the lithiated intercalation compound cathode electrically accessible by means of a protruding conductive aluminum tab 103. The anode (not shown) and cathode (not shown) of the assembled cell 101 are separated by a porous separator (not shown) that is permeated with an aprotic non-aqueous electrolyte (not shown) that is in effective contact with both the anode and cathode.

In FIG. 7, above the assembled cell 101, there is also shown the components of the cell 101, comprised of a pair of one-sided cathodes 104A and 104B and a carbon-carbon composite anode 105, suitable to be assembled as a sandwich (cell 101) with the anode 105 positioned between the respective cathodes 104A and 104B being separated from the anode 105 by respective porous separators 106A and 106B that are permeated with an aprotic, non-aqueous electrolyte that is in effective contact with both the cathode and the facing anodes.

Conductive aluminum tabs 103A and 103B are provided for the respective cathodes 104A and 104B and a nickel conductive tab 102A is provided for the anode 105, whereby the respective electrodes of the cell 101 are electrically accessible when assembled as a sandwich and enclosed within a sealed enclosure.

The materials of the respective anodes and cathodes of the cell 101 may be formed of materials, as described herein in further detail. For example, as described above, the anode comprises carbon-carbon composite. The cathode may be formed of $LiCoO_2$, $LiNiCoO_2$, $LiNiO_2$, $LiMn_2O_4$, $LiMnO_2$, $LiV_2O_5$, $LiV_6O_{13}$, $LiTiS_2$, $Li_3FeN_2$, $Li_7VN_4$, $Li_7MoN_4$, $Li_2ZrN_2$ or a combination thereof, supported by an aluminum foil substrate. The respective anode and cathode electrodes are maintained spaced from one another by a respective electrically non-conductive separator that is permeable, whereby the aprotic, non-aqueous electrolyte is carried by the spacers and maintained in effective electrochemical contact with both the cathode and facing anode. The permeable separator may be formed of a micro-porous poly-olefin film.

It is to be understood that a plurality of electrochemical cells as described above can be used to assemble a battery of such cells by connecting the respective electrodes of the assembly of cells in an electrical circuit and in a known fashion to produce a battery with the voltage or current characteristics as determined by the number of cells connected in series or parallel circuit relationship.

The following specific examples are given to illustrate the practice of the invention, but are not to be considered as limiting in any way.

EXAMPLES 1

Carbon-carbon composite heat-treated to 2600° C. in an inert atmosphere was used as an anode of a lithium-ion cell to evaluate the concept of the present invention. The carbon-carbon composite was used as a thin film of thickness 300 m. The lithium-ion cell included a negative electrode made from the carbon-carbon composite, a lithiated nickel dioxide positive electrode and 1M $LiPF_6$ electrolyte in a mixture (1:1 v/v) of ethylene carbonate/dimethyl carbonate (EC/DMC) solvents. A micro-porous poly-olefin (Celgard 2400) separator was used in between the positive and negative electrodes to isolate them electronically. The positive electrode was made from a mixture of 85% $LiNi_{0.8}Co_{0.2}O_2$, 6% carbon black and 9% PVDF in DMF by coating on to an aluminum foil.

The aprotic, non-aqueous 1M $LiPF_6$ electrolyte mixture permeated the micro-porous poly-olefin separator, whereby the electrolyte was in effective contact with both the positive and negative electrodes, which were nevertheless maintained space and electrically isolated from one another.

The developed cell was charged at a constant current of 0.5 $mA/cm^2$ to 4.0 V and then at a constant voltage (4.0 V) for 3 hours or until the current dropped to 0.02 $mA/cm^2$. The cell was then discharged at a constant current of 0.5 $mA/cm^2$ to a cut-off voltage of 2.75 V. The charge discharge process was repeated in order to evaluate the cycle life. FIG. 1 shows the cycling characteristics of the developed cell according to the present invention. The cell delivered 580 cycles with 91.8% capacity retention.

A lithium-ion cell was made with the same components as described above except the negative electrode was made from a mixture of 90% MCMB 2528 carbon and 10% PVDF in DMF by coating on to a copper foil. It is noteworthy to mention that MCMB 2528 carbon is used as an active material of anode for commercial lithium-ion cell. The cell was charged and discharged under the same conditions as the previous cell. FIG. 2 shows the cycling behavior of this prior art cell. The cell lost 20% capacity after delivering only 557 cycles. FIG. 3 shows a comparison to the cycling behavior of the cell made in accordance to the present invention and that made according to the prior art.

EXAMPLES 2

A lithium-ion cell was made as in Example 1 with the carbon-carbon composite heat treated to 2800° C. as anode, lithiated cobalt oxide as active cathode material and an electrolyte comprising 1M $LiPF_6$ in a mixture of ethylene carbonate and diethyl carbonate (1:1 v/v). The cell was first charged at a constant current of 0.5 mA/cm$^2$ to 4.1 V and then at a constant voltage (4.1 V) for a period of three hours or until the current dropped to 0.02 mA/cm$^2$. The cell was then discharged at a constant current of 0.5 mA/cm$^2$ to a cut-off voltage of 3.0 V. The charge-discharge process was repeated at least two times in order to obtain a cycling efficiency greater than 99%. The cell was then fully charged and left at open-circuit voltage (OCV) at ambient temperatures to evaluate the self-discharge behavior. The cell was left at OCV for a period of a month (720 hours). After storage, the cell was discharged at a constant current of 0.5 mA/cm$^2$ to a cut-off voltage Of 3.0 V.

A lithium ion cell was made with the same components as described above except the negative electrode was made from a mixture of 90% MCMB 2528 carbon and 10% PVDF in DMF by coating on to a copper foil. The above experimental steps were repeated with the cell.

FIG. 4 shows a comparison of voltage decay with time for the lithium-ion cells made in accordance with the present invention and in accordance with the prior art. A voltage decay of only 10 mV was observed with the cell made in accordance to the present invention. For the prior art cell, a voltage decay of 60 mV was observed.

The discharge behavior (before and after storage) of the lithium-ion cell made in accordance with the prior art is shown in FIG. 5. The cell lost a capacity of 11% due to storage for a month. FIG. 6 shows the discharge behavior (before and after storage) of the lithium-ion cell made in accordance with the present invention. This cell lost only 2% capacity after storage for a month.

What is claimed is:

1. A rechargeable electrochemical cell comprising a body of aprotic, non-aqueous electrolyte, first and second electrodes in effective contact with said electrolyte, the first eletrode comprising a lithiated intercalation compound, and the second electrode comprising a carbon-carbon composite material which does not contain organic binder, and wherein said second electrode does not have a carbon metal interface as a part of the second electrode.

2. An electrochemical cell as defined in claim 1, wherein the carbon-carbon composite is made by heating in the temperature range of 1000° C. to 3000° C.

3. An electrochemical cell as defined in claim 1, wherein the carbon-carbon composite has a density in the range of 1.3 g/cc to 2.0 g/cc.

4. An electrochemical cell as defined in claim 1, wherein the carbon-carbon composite possesses an electrical specific resistance in the range of 50–1,000 $\mu$ohm-cm.

5. An electrochemical cell as defined in claim 1, wherein the carbon-carbon composite has a thermal conductivity in the range of 50–600 $Wm^{-1}K^{-1}$.

6. An electrochemical cell as defined in claim 1, wherein the carbon-carbon composite is made from pitch-based carbon fiber.

7. An electrochemical cell as defined in claim 1, wherein the carbon-carbon composite is made from PAN-based carbon fiber.

8. An electrochemical cell as defined in claim 1, wherein the carbon-carbon composite is made from rayon-based fiber.

9. An electrochemical cell as defined in claim 1, wherein the lithiated transition metal intercalation compound of the first electrode comprises a compound taken from a group comprising $LiCoO_2$, $LiNiCoO_2$, $LiNiO_2$, $LiMn_2O_4$, $LiMnO_2$, $LiV_2O_5$, $LiV_6O_{13}$, $LiTiS_2$, $Li_3FeN_2$, $Li_7VN_4$, $Li_7MoN_4$, and $Li_2ZrN_2$, and combinations of the foregoing.

10. An electrochemical cell as defined in claim 1, wherein the electrolyte is a non-aqueous organic electrolyte solution comprising a lithium compound solute dissolved in a non-aqueous solvent.

11. An electrochemical cell as defined in claim 10, wherein the electrolyte comprises a solute selected from a group comprising $LiPF_6$, $LiBF_4$, $LiAsF_6$, $LiCF_3SO_3$, $LiN(CF_3SO_2)_2$, and $LiClO_4$.

12. An electrochemical cell as defined in claim 10, wherein the electrolyte comprises a non-aqueous solvent selected from a group comprising propylene carbonate, ethylene carbonate, diethyl carbonate, dimethyl carbonate and ethyl methyl carbonate, and combinations of the foregoing.

13. An electrochemical cell as defined in claim 1, wherein the first electrode is a cathode comprising a metal substrate having the lithiated intercalation compound affixed to a surface thereof, wherein the second electrode is an anode comprising a carbon-carbon composite and wherein said respective surfaces of the cathode and anode are separated from one another by a micro-porous electrically non-conductive separator that is permeated by said aprotic, non-aqueous electrolyte which is in effective contact with said respective surfaces of the anode and cathode.

14. An electrochemical cell as defined in claim 13, wherein the separator comprises a micro-porous poly-olefin film.

15. An electrochemical cell as defined in claim 13, wherein the cathode and anode form a sandwich that is contained within a sealed enclosure and wherein each of said cathode and anode has a connector extending out of the sealed enclosure for connecting said cell to an external electric circuit.

16. An electrochemical cell as defined in claim 13, wherein the cathode including its substrate, anode, and the electrolyte permeated separator are all contained within a sealed enclosure and wherein each of said cathode and anode has a connector extending out of the sealed enclosure for connecting said cell to an external electric circuit.

17. A battery comprising a plurality of electrochemical cells as defined in claim 1, having their respective electrodes connected in an electric circuit defining a battery of said cells.

18. A battery comprising a plurality of electrochemical cells as defined in claim 13, having their respective electrodes connected in an electric circuit defining a battery of said cells.

19. A battery comprising a plurality of electrochemical cells as defined in claim 16, having their respective electrodes connected in an electric circuit defining a battery of said cells.

* * * * *